Figure 5:
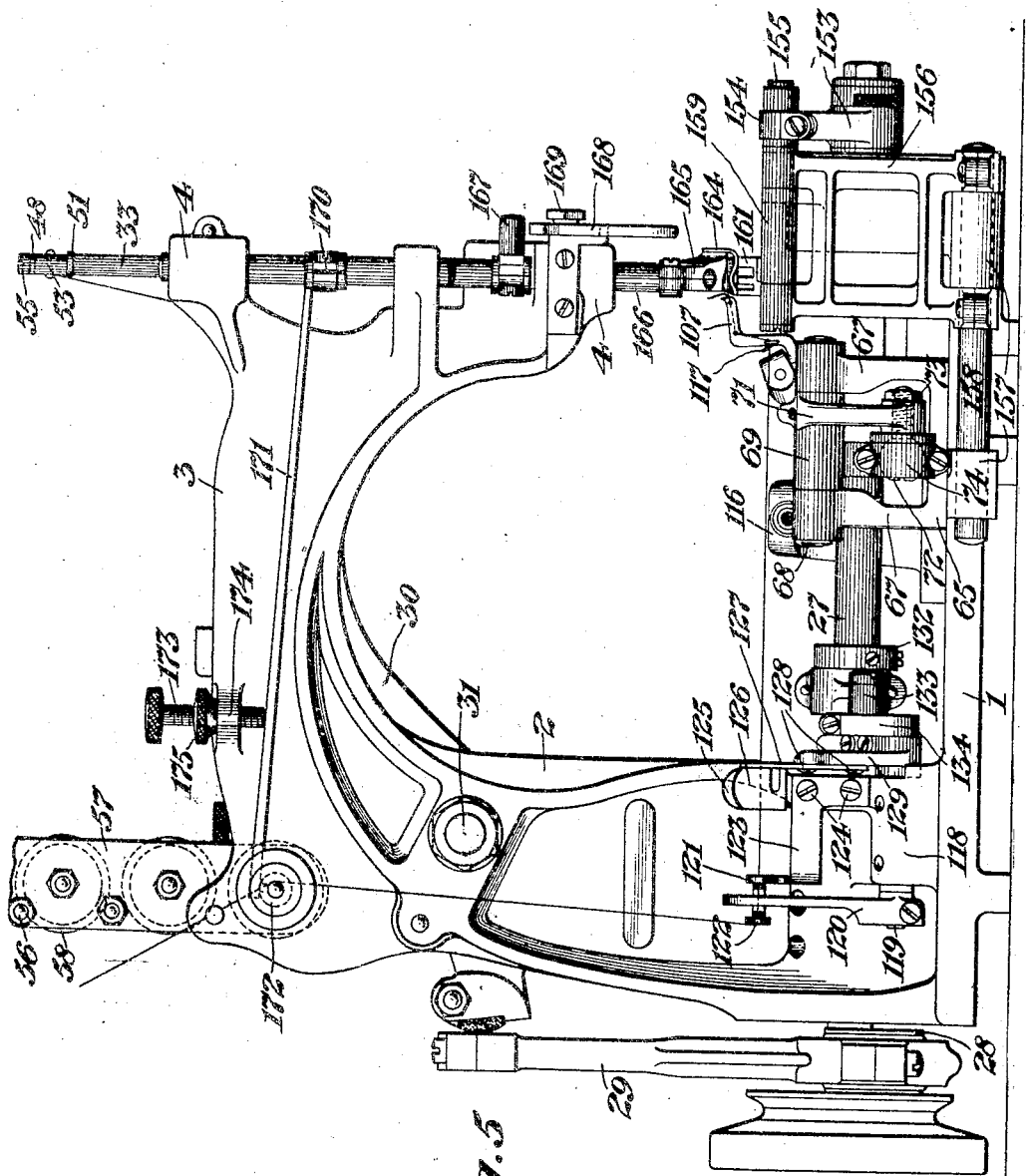

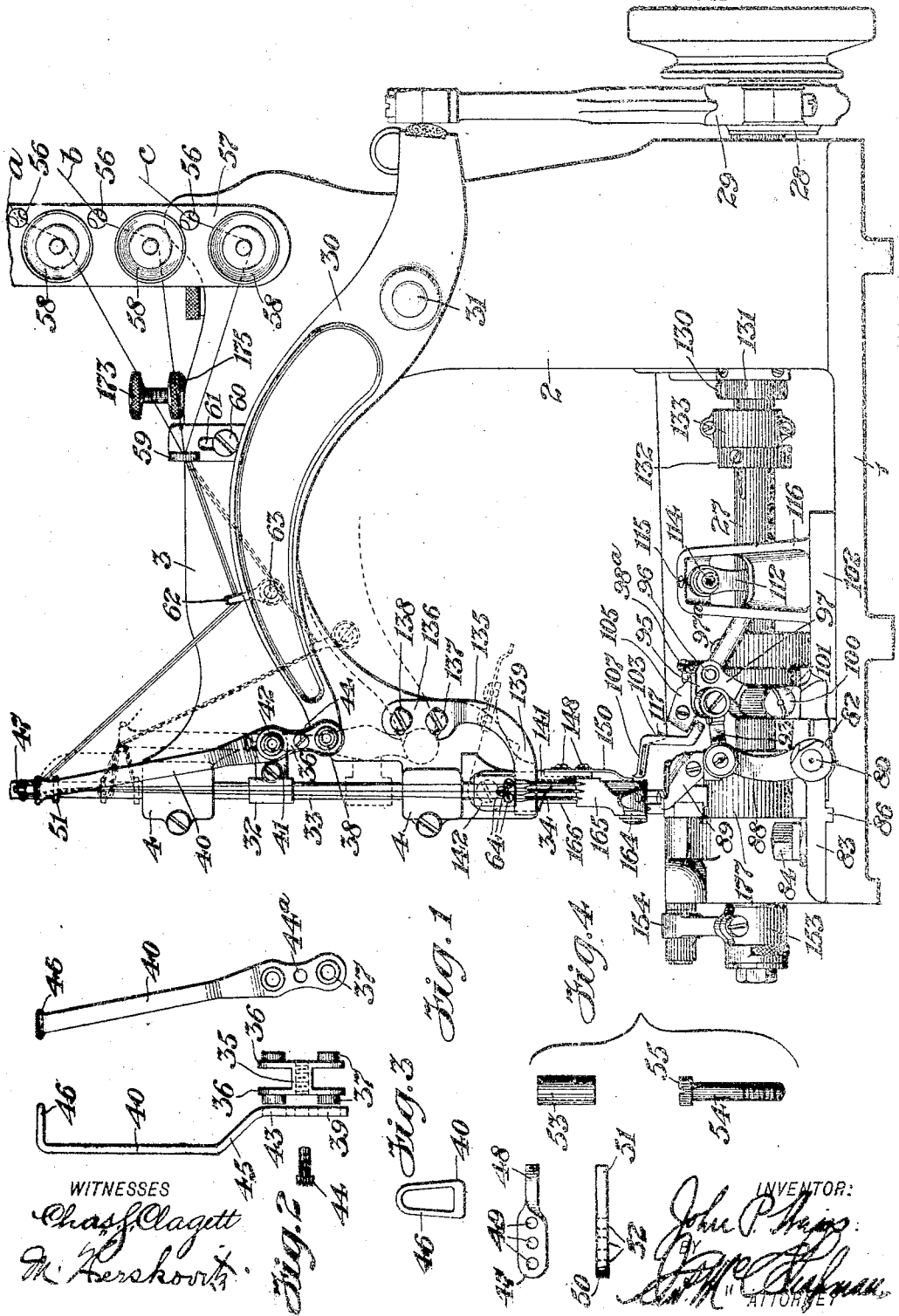

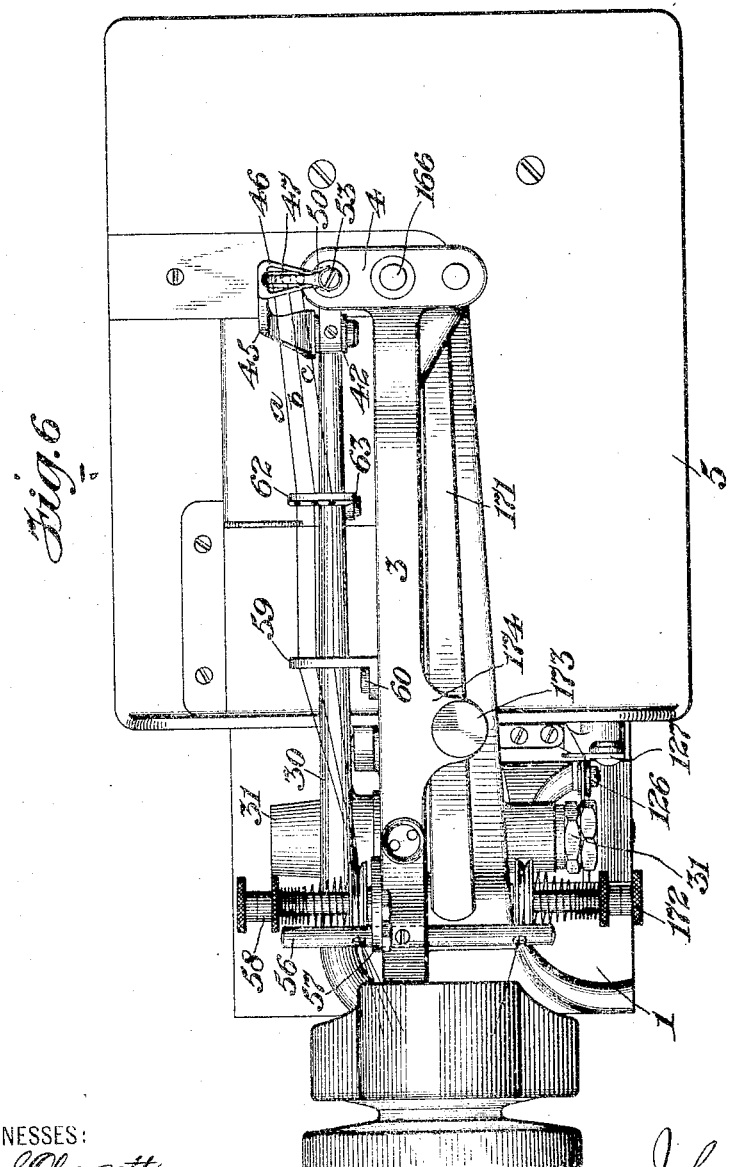

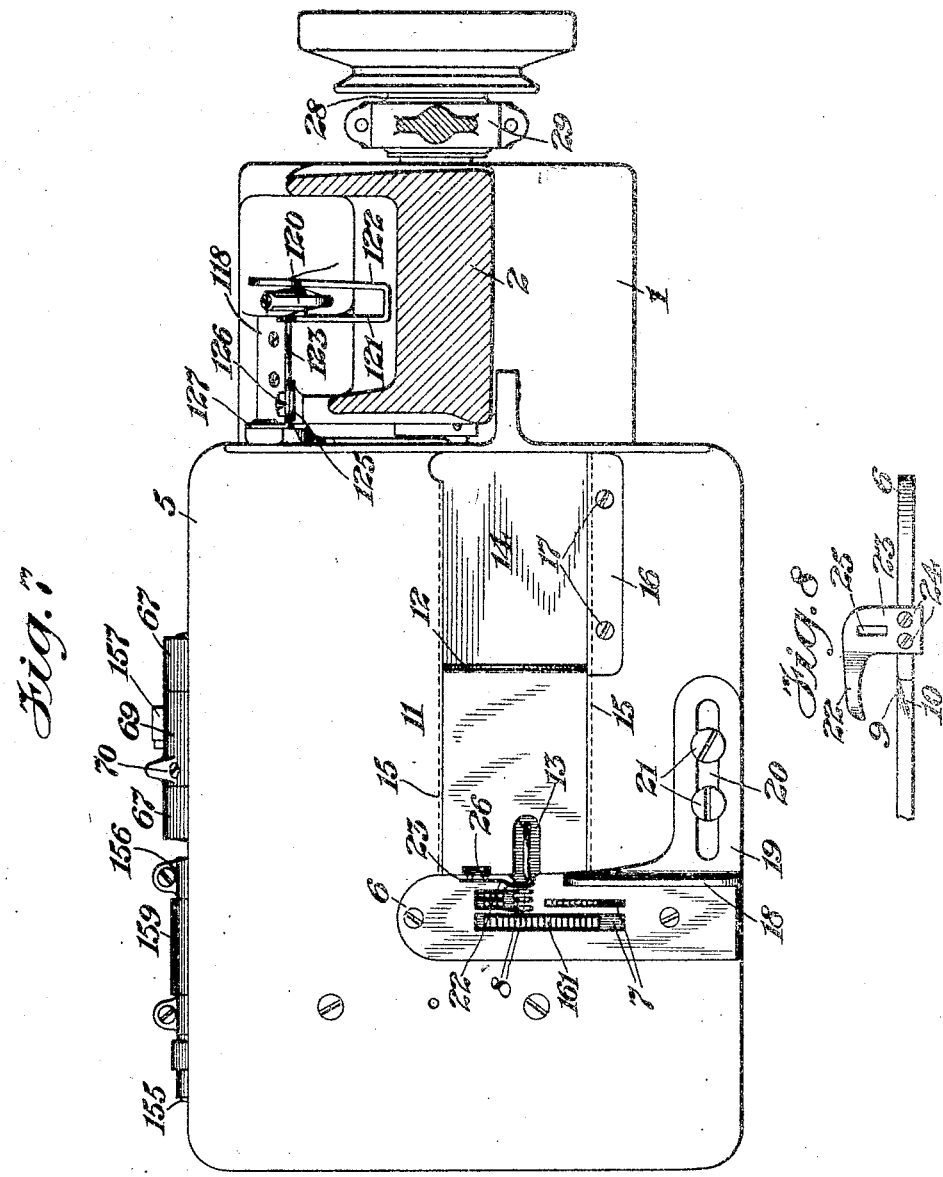

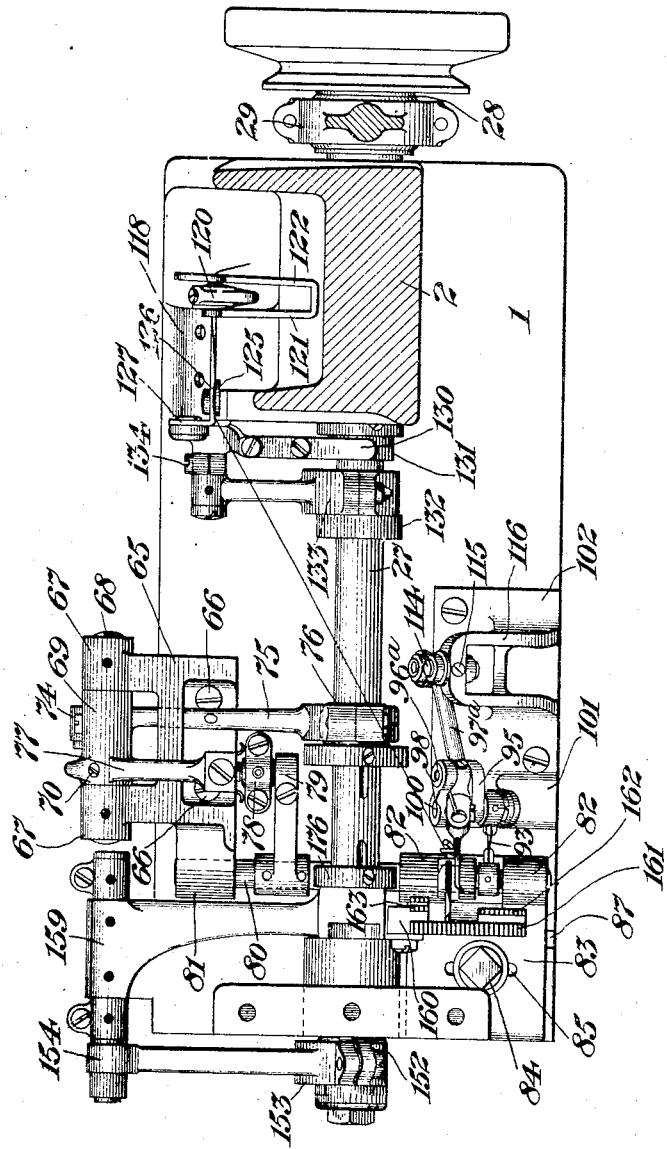

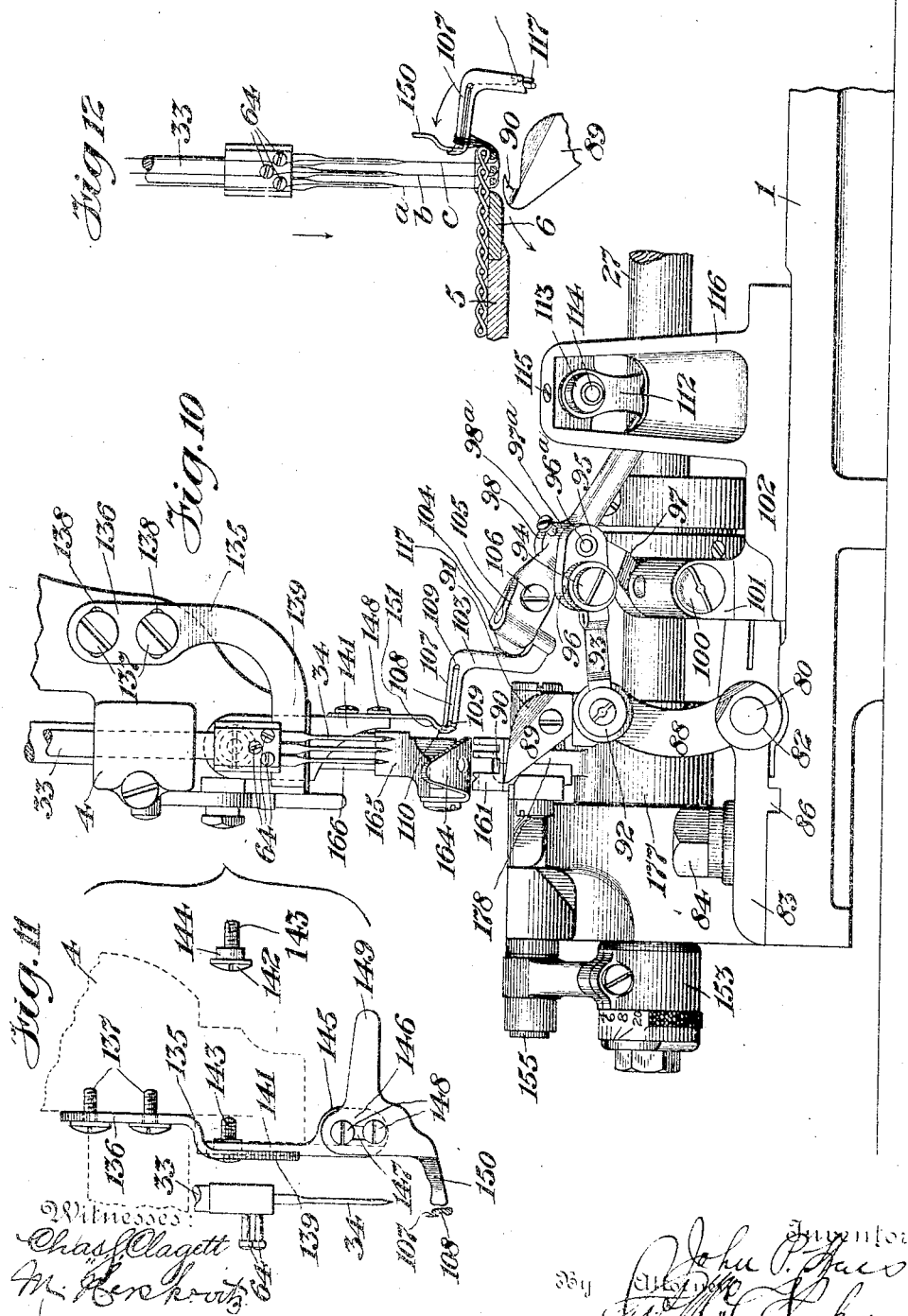

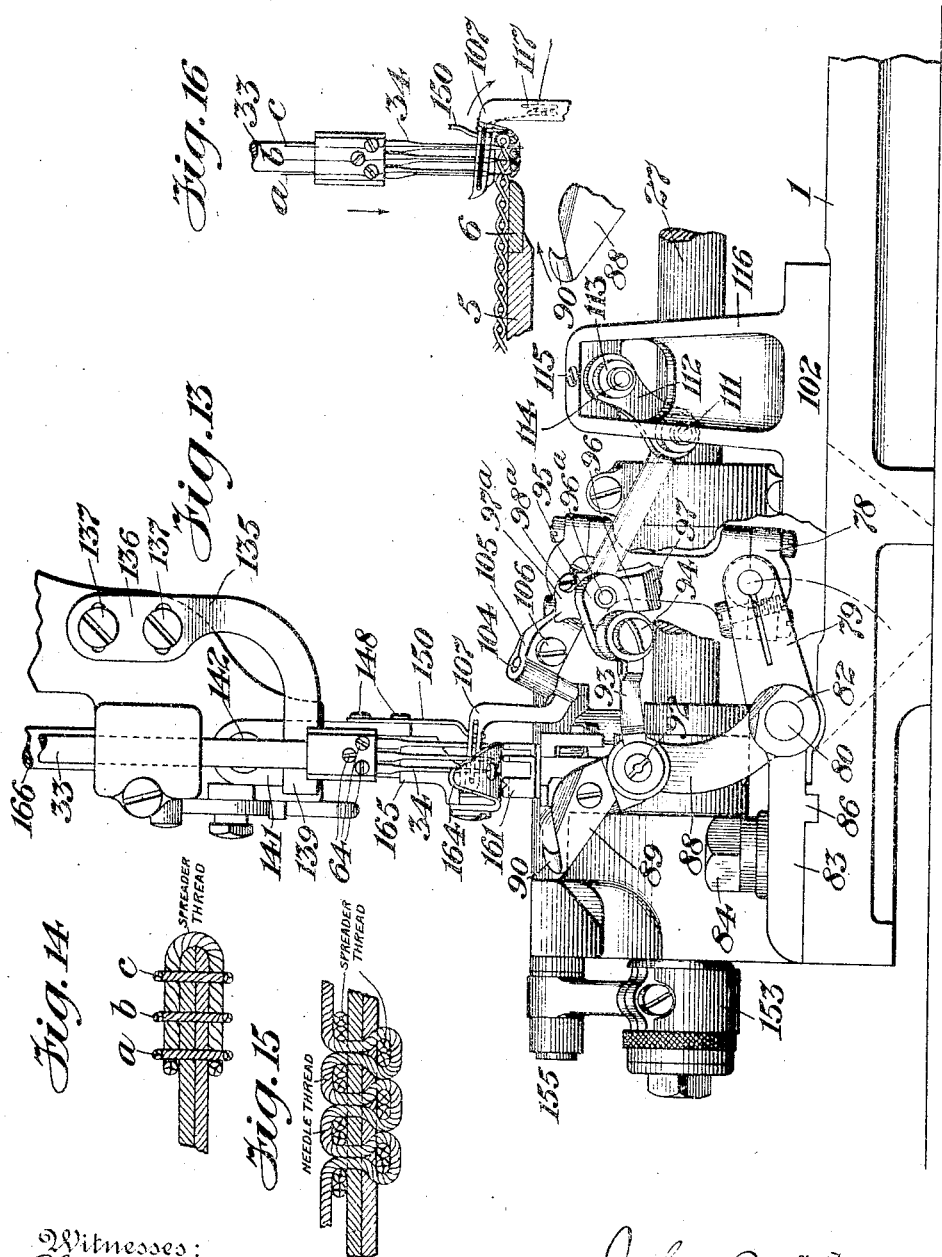

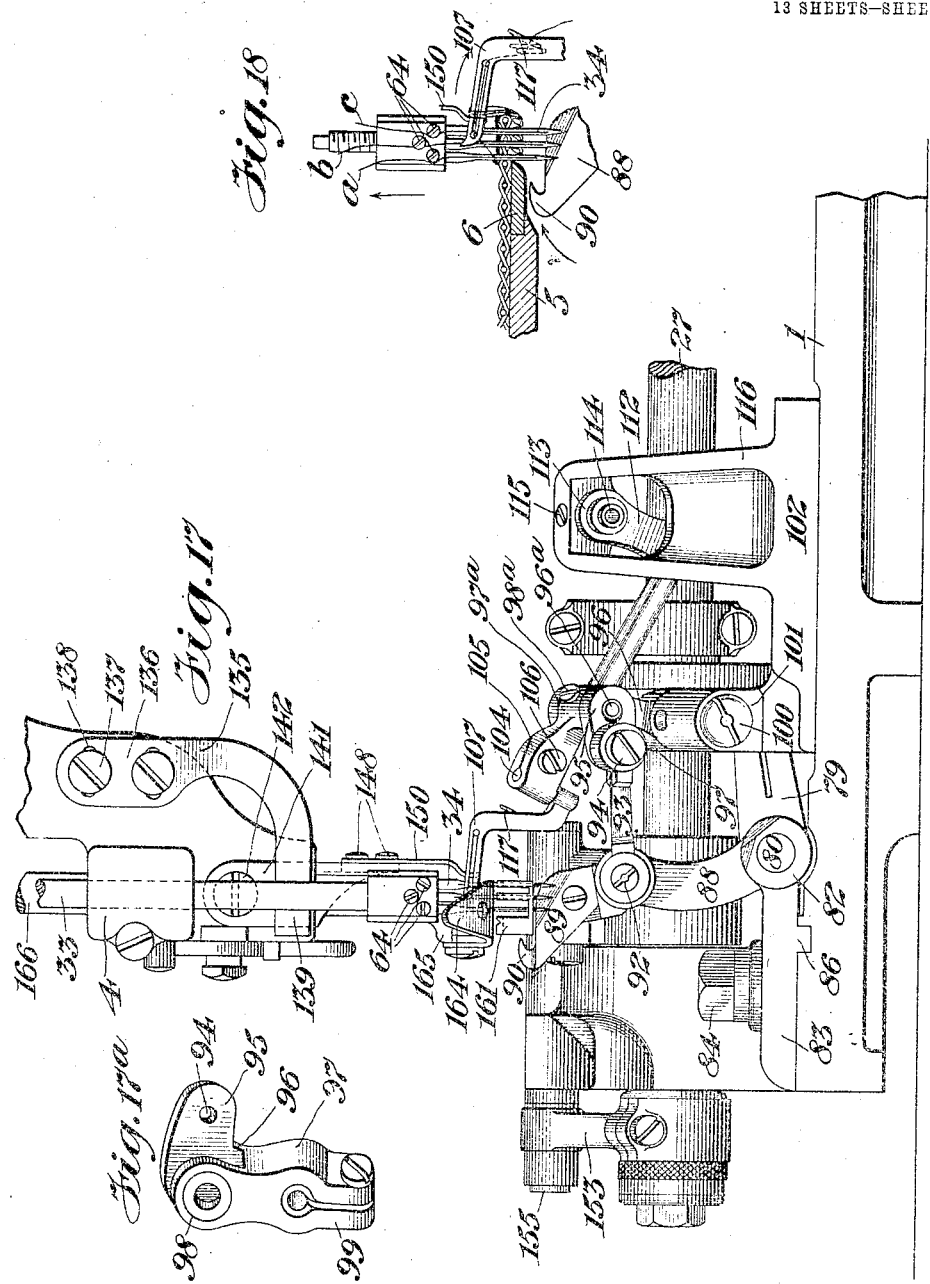

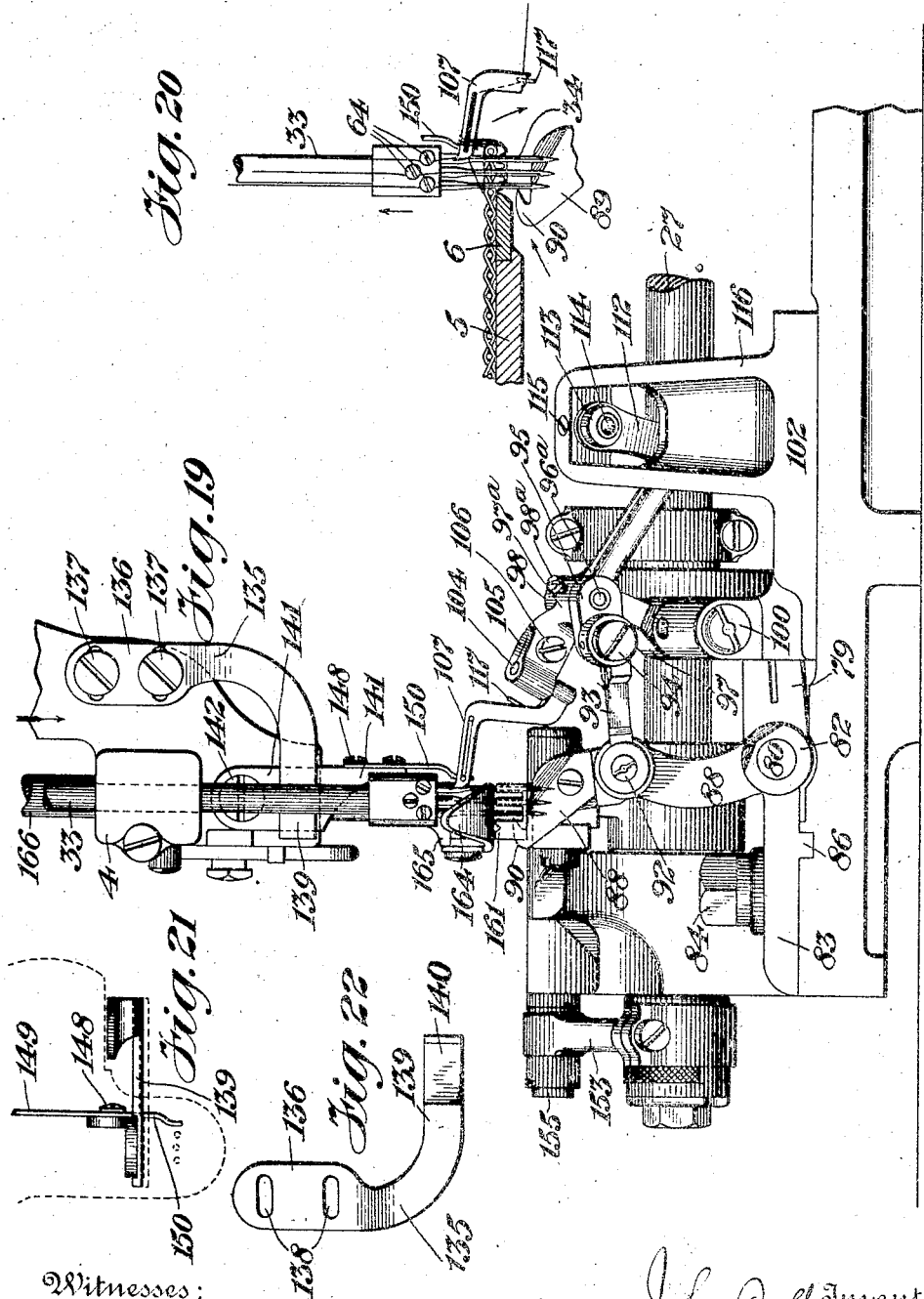

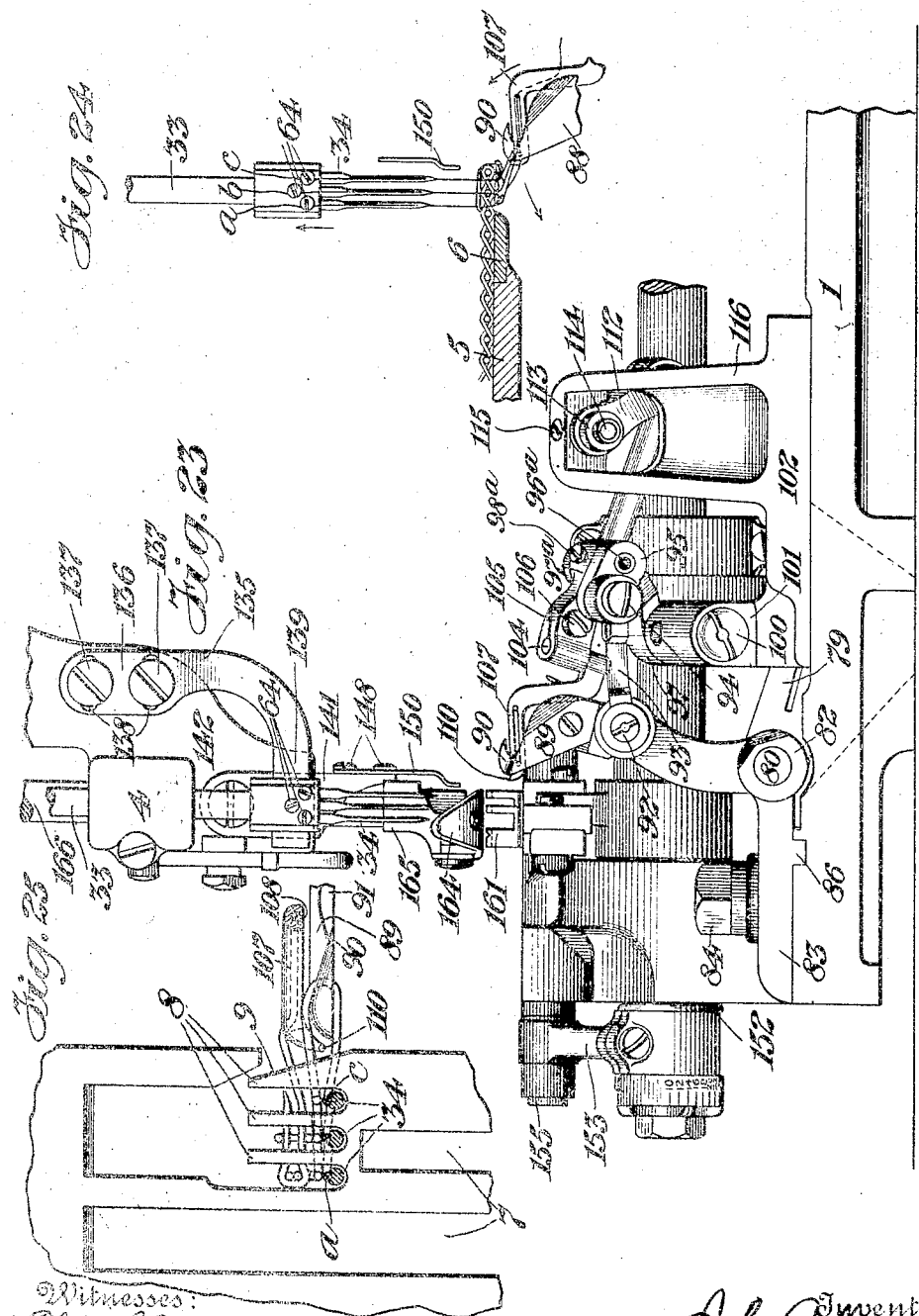

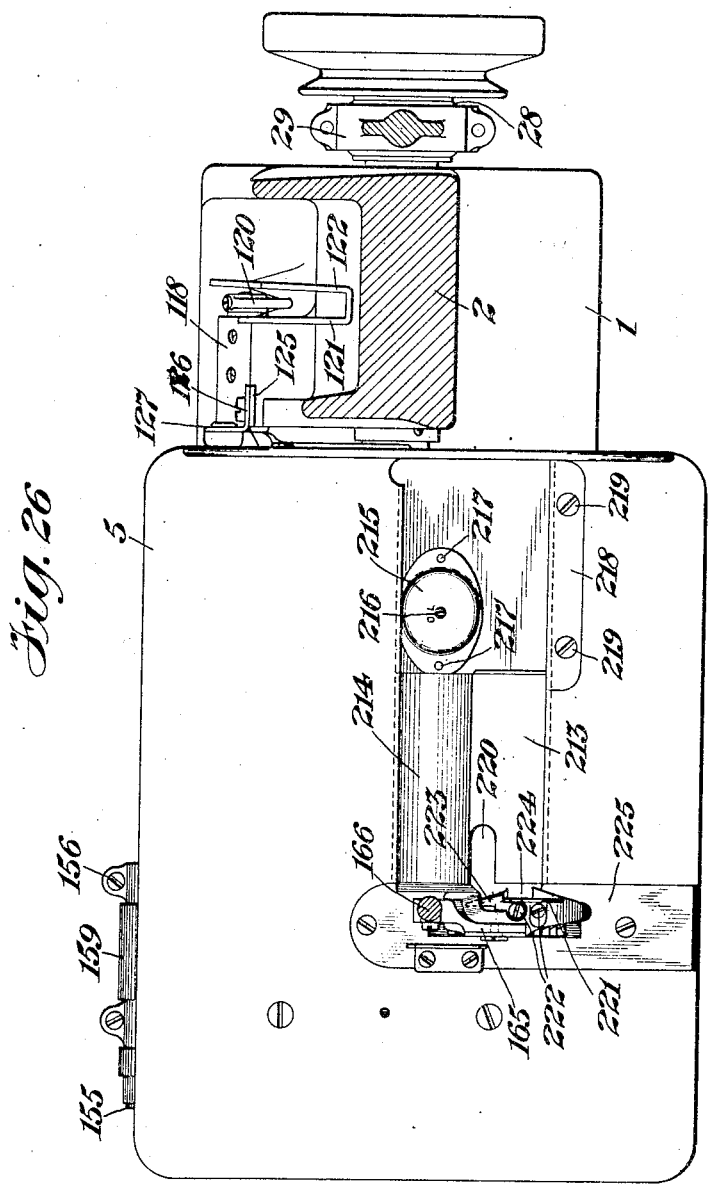

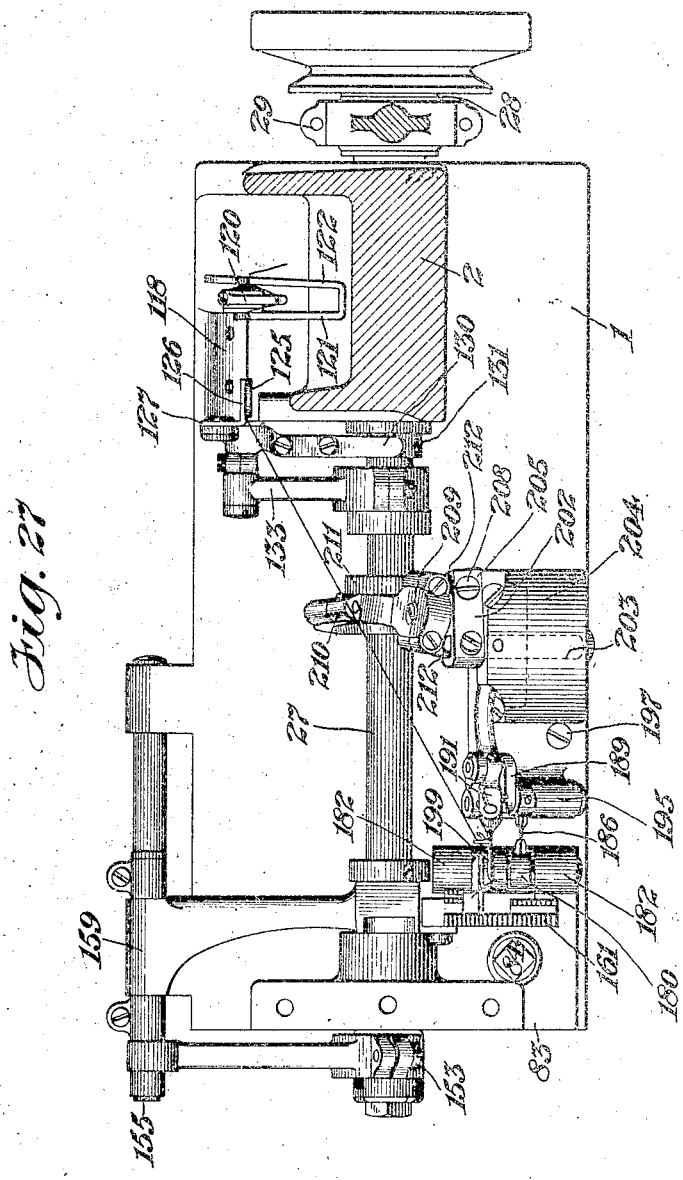

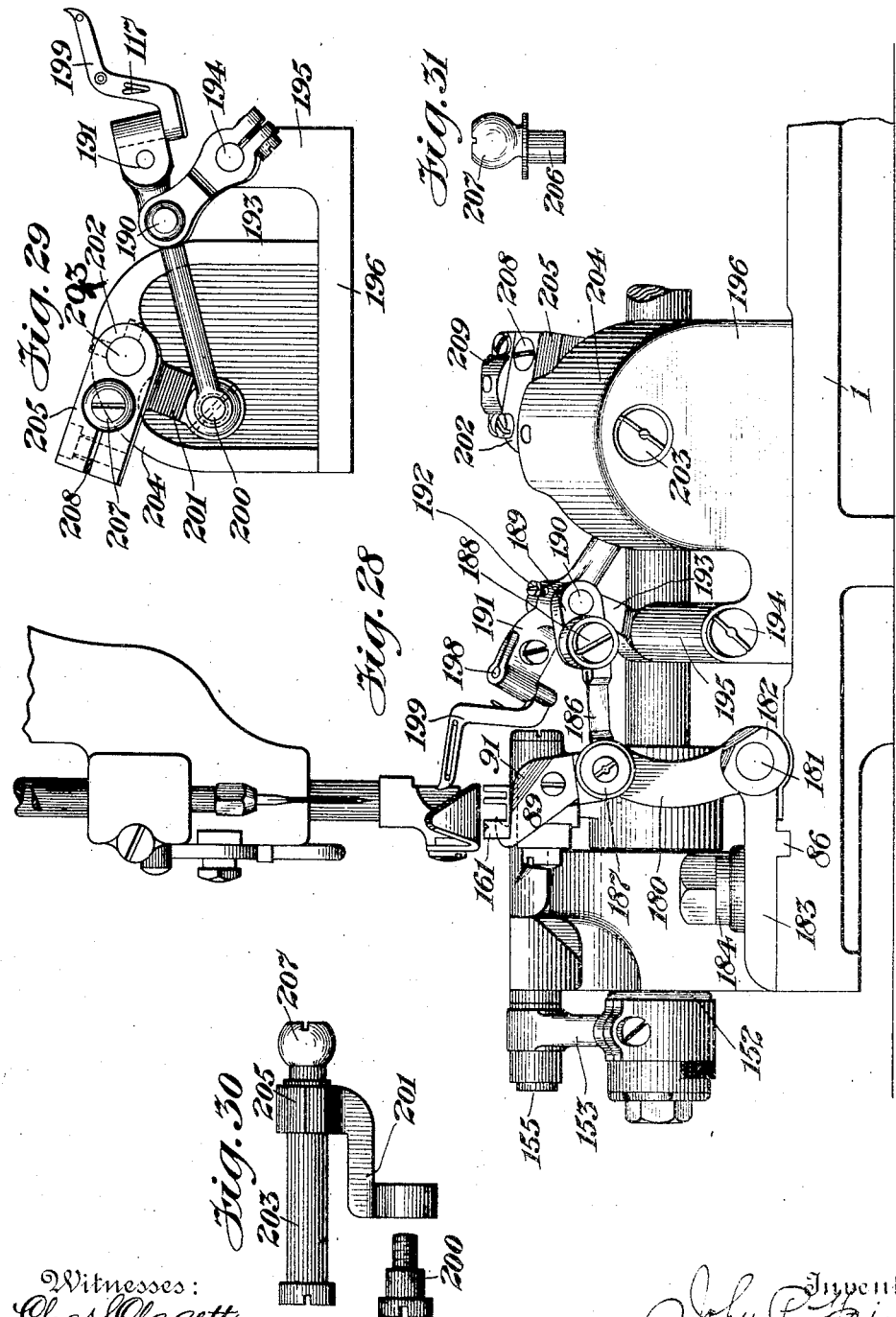

UNITED STATES PATENT OFFICE.

JOHN P. WEIS, OF NYACK, NEW YORK, ASSIGNOR TO METROPOLITAN SEWING MACHINE COMPANY, OF NYACK, NEW YORK, A CORPORATION OF NEW YORK.

OVEREDGE STITCHING-MACHINE.

1,097,381.    Specification of Letters Patent.    Patented May 19, 1914.

Application filed July 1, 1907. Serial No. 381,601.

*To all whom it may concern:*

Be it known that I, JOHN P. WEIS, a citizen of the United States, residing in Nyack, county of Rockland, and State of New York, have invented a new and useful Improvement in Overedge Stitching-Machines, of which the following is a description.

This invention relates to sewing machines, and has particular reference to overedge-stitching machines used for the purpose of producing an ornamental edging, binding or selvage on all kinds of fabric, and particularly on knit goods, heavy woolen fabrics and felted materials.

Among the objects of my invention may be noted the following: to provide a stitch-forming mechanism by means of which an overedge stitch may be produced with one or more needles, whereby an ornamental edging and selvage may be applied to fabrics composed of two or more threads; to provide a stitch-forming mechanism for producing ornamental or selvage edges, whereby fabrics of all kinds may have their edges bound by an ornamental and selvage-producing stitch; and, generally, to provide a stitch-forming mechanism, the elements of which will include one or more needles, a looper coöperating with the needles, and a spreader, the looper being non-thread-carrying, and the spreader being thread-carrying, and wherein the elements constituting the looper and spreader parts may be interchangeable for a single-needle machine, or a machine employing a plurality of needles.

With the above objects in view, and others which will be detailed during the course of this description, my invention consists in the parts, features, elements and combinations of elements and mechanisms hereinafter described, and particularly set forth in the claims.

In order that my invention may be clearly understood, several sheets of drawings have been provided, and therein—

Figure 1 shows in side elevation so much of a sewing machine as is deemed necessary for the purpose of illustrating my invention, the latter including in this instance three needles as a part of the stitch-forming mechanism, and the view omitting the cloth-plate in order that the parts thereunder may be clearly understood; Fig. 2 shows in detail the take-up illustrated in Fig. 1, the view including an edge elevation and a front elevation of the take-up lever, a side elevation of the supporting-link for the take-up, which link is a part of the connection between the needle-bar and needle-actuating lever, and also the screw which secures the take-up lever to its supporting-link; Fig. 3 is a top plan view of the take-up lever, showing the guide-aperture therein through which the several threads run in their passage to the needle; Fig. 4 is a view showing the details of the thread-guide and its support which is carried by the upper end of the needle-bar, the view showing a top-plan and edge-elevation of said guide, a side-elevation of the supporting-sleeve, and a side-elevation of the screw which clamps the guide and sleeve to the upper end of the needle-bar; Fig. 5 is a rear-elevation of the machine shown in Fig. 1, with the parts in the same position as in the latter figure, and the cloth-plate being omitted for the purpose of clearly showing the parts thereunder; Fig. 6 is a top-plan view of the machine shown in Fig. 1, the same being intended to illustrate the cloth-plate structure and the disposition of the thread-guides, the thread-tensions, and the take-up; Fig. 7 is a top-plan view of the cloth-plate of the machine, the overhanging arm of the machine being shown in section substantially on the level with said cloth-plate, and this view showing the spreader in substantially the position of Fig. 1, together with the thread carried by the spreader traced back by dotted lines to and through the thread-clamp and controller; Fig. 8 is a side-elevation of the diverter carried by the throat-plate, the views showing a section of the throat-plate and the relation of the diverter to the tongues on the latter; Fig. 9 is a top-plan view of the parts of the stitch-forming and feeding mechanisms which are located below the cloth-plate of the machine, the stitch-forming mechanism being of the type illustrated in Fig. 1; Fig. 10 is a detail view on an enlarged scale showing, in side elevation, the elements of the stitch-forming mechanism, together with the loop-diverter which coöperates with the spreader, this view also showing a part of the feed mechanism, and omitting the cloth-plate; Fig. 11 is a detail view illustrating the construction of the loop-diverter, and also its relation to the needles and loop-spreader, the latter being shown in section, and showing in side elevation the thread-guides and separators carried by the lower end of the needle-bar, and the pivot screw 142; Fig. 12 is a detail view illustrating the needles, looper, spreader, loop-diverter and throat-plate in the relation shown in Fig. 10, and showing the manner in which the needle-threads are manipulated by the spreader in one stage of the operation of the stitch-forming mechanism in making an overedge stitch with three needle-threads and a spreader-thread, the fabric which is being overedged being shown in position on the cloth-plate; Fig. 13 is a view similar to Fig. 10, but illustrating the parts thereof in another position; Fig. 14 is a detail view showing the manner in which the spreader-thread overlies the edge of the work, and the manner in which the three needle-threads are encircled by the spreader-thread; Fig. 15 is a detail illustrating the construction of the stitch and showing the manner in which the spreader-thread is overstitched by the needle-threads, and the loops of the latter are entered and retained by the spreader-thread; Fig. 16 is a view similar to Fig. 12, but illustrating the parts in still another position; Fig. 17 is a view similar to Fig. 10, but illustrating the parts in still another position; Fig. 17ª is a perspective view of the link and crank forming part of the connection between the looper and spreader mechanisms; Fig. 18 is a view similar to Fig. 16, but illustrating the parts in the stitch-forming position of Fig. 17; Fig. 19 is a view similar to Fig. 17, but illustrating the parts in a different position; Fig. 20 is a view similar to Fig. 18, but illustrating the parts in the stitch-forming position of Fig. 19; Fig. 21 is a top-plan view of the loop-diverter; Fig. 22 is a rear-elevation of the latch, forming part of the loop-diverter mechanism; Fig. 23 is a view similar to Fig. 19, but illustrating the parts in a different position; Fig. 24 is a view similar to Fig. 20, but illustrating the parts in the stitch-forming position of Fig. 23; Fig. 25 is a top-plan view of a portion of the throat-plate, and of a portion of the looper and spreader, and showing the needles in section and illustrating the several elements in the coöperative relation shown in Fig. 24; Fig. 26 is a top-plan view of the cloth-plate, similar to that of Fig. 7, but illustrating the structure of throat-plate, slide-plate and other parts of the cloth-plate, and the presser-foot of the single-needle type of machine; Fig. 27 is a top-plan view similar to Fig. 9, but illustrating another type of looper and spreader mechanisms; Fig. 28 is a view similar to Fig. 10, but illustrating another form of looper and spreader mechanisms; Fig. 29 is a rear elevation of the spreader-supporting bracket showing the spreader and spreader-actuating mechanism in position; Fig. 30 is a detail view illustrating a part of the spreader-actuating mechanism; and Fig. 31 is a side elevation of the eccentric crank-pin forming part of the spreader-actuating mechanism.

Primarily, it should be understood that the stitch-forming mechanism hereinafter described is not limited in its application to the particular type of machine shown in the drawings, but may be applied to practically any type of machine employing a right-line reciprocating needle and other complemental parts coöperating with the needle for forming an overedge stitch.

The machine illustrated in the drawings is the well-known Metropolitan chain-stitch machine, modified in certain particulars to adapt it to the stitch-forming mechanism of my invention. In particular, it will be noted that the usual needle-actuating lever of the three-arm type is not employed, hence the looper and spreader are not actuated from the needle-lever as is usual in this type of machine. This is an important feature of my invention and an important structural and functional factor, in that the needle-arm may be made lighter, a great deal of the strain is removed therefrom, the looper and spreader are actuated directly from the driving-shaft below the cloth-plate by compact mechanism, and all of the looper and spreader actuating parts are located below the cloth-plate, which latter may be of "box" type to avoid the accumulation of lint, dust and other particles upon the wearing and operating parts of the machine. Furthermore, it should be noted that the driving and actuating parts of the looper and spreader mechanisms are interchangeable for the single and plural needle types of machines, and that, though I have illustrated one form of mechanism for driving the looper and spreader in a number of figures, with particular reference to the plural needle type of machine, and another form of mechanism for driving the spreader and looper with particular reference to the single needle type of machine, my invention is not limited, in certain broad particulars, to the details of the looper and spreader actuating mechanisms shown in the drawings; but, it is within the scope of my invention to make the driving or actuating mechanisms for the looper and spreader shown in the several figures of the drawings interchangeable, irrespective of whether the machine is of the single or plural needle type. Therefore, in the claims, certain features and combinations of elements involved in the looper and spreader mechanisms will be claimed broadly and without reference to whether they are found or employed in a single or plural needle machine.

Referring to the details shown in the drawings, the numeral 1 indicates the bed-plate of the machine, 2 the vertical arm thereof, 3 the overhanging portion of the arm, and 4 the head or bearings in which the needle and presser-bars operate.

The cloth-plate of the machine is indicated by the numeral 5, and, as shown in Fig. 7, has set therein the throat-plate 6, provided with the feed-slots 7, and tongues 8, over which the stitches are formed and between which the needles reciprocate. As shown in Figs. 8 and 25, the innermost one of the tongues 8 has its outside beveled rearwardly as shown at 9, and its bottom beveled upwardly as shown at 10, while the inner edge of this tongue is straight. Thus, it will be seen that, when the needle-loops are formed or carried over the edge of the throat-plate, or over the edge of this tongue, their passage toward its free end will be facilitated and there will be practically no drag upon said tongues by the said loops and the tongues will have no tendency to retain the loops thereon. The cloth-plate is also provided with the slide-plate 11 provided with the upturned portion 12, which forms a handle by means of which it can be slid back and forth, said slide-plate 11 having the longitudinally-extending, open-end slot 13, through which the spreader works in lifting the needle-loops over the edge of the work. The cloth-plate is depressed at 14, and provided with ways or guides 15, shown by dotted lines, in which the slide-plate 13 operates, the depression 14 allowing the slide-plate to be moved to position at the right end of the cloth-plate. For inserting the slide-plate 11 in position, a removable guide-gib 16 is provided, the same being held in position on the cloth-plate by means of the screws 17 passing therethrough, and tapped into the cloth-plate. The cloth-plate is provided at its forward edge with a guide 18, the shank 19 of which has the longitudinal slot 20, through which pass the screws 21, and which are tapped into the cloth-plate. Thus, the guide may be adjusted longitudinally of the cloth-plate and with reference to the line of feed and the lines of stitching which are to be placed in the work. The throat-plate has a diverter secured to its inner side, in rear of the tongues 8, the overhanging curved portion 22 of which is extended forward over the beveled outer tongue 8, and substantially in parallelism therewith, the end of the diverter terminating substantially at the base of said tongues. The shank 23 of the diverter is secured by means of screws 24 to the side of the throat-plate into which latter said screws are tapped, see Fig. 8. The aperture 25, in the body of the diverter, is provided for the purpose of permitting the insertion of an instrument through the medium of which the diverter may be removed, or supported preparatory to setting the same in place, and to accommodate the heads of the screws 24, the slide-plate 11 is provided with a recess 26. The function of this diverter is substantially the same as the pusher which is particularly described hereinafter. The diverter and the pusher may be used at the same time, when in the machine, or one may be used without the other. In either case, the function is the same; but, when used together in the machine the control of the loops of needle-thread is certain. Nevertheless, I desire it understood that either of the devices controls the loops of needle-thread as hereinafter described, and the other is not absolutely essential to the proper manipulation of the threads in making the stitches. I have shown the two, however, in the drawings for the purpose of illustrating the modes in which I have contemplated carrying out my invention and, in order to avoid confusion, have given the two devices distinguishing terms.

The main shaft is indicated by 27 and carries at its rear end the usual eccentric 28, surrounded by the strap 29, the upper end of which is pivoted in usual manner to the rear end of the needle-lever 30, fulcrumed at 31 to the vertical portion 2 of the frame and having its forward end connected by a link to a collar 32, clamped in usual manner to the needle-bar 33, carrying at its lower end the several needles 34. The said link-connection is of peculiar construction, the details of which are shown in Fig. 2 in combination with the take-up lever. In this figure the link is shown to consist of the central screw-threaded hub-portion 35, having the parallel arms 36 extending in opposite directions from said hub-portion, and each of said arms 36 carrying a short stud or journal-bearing 37 extending outwardly therefrom. This construction gives to the link bifurcations on opposite sides of the central hub 35, in the lower end of which the forward end of the needle-lever 30 fits and is held by the journal-pin 38, which extends through the bearings 37 and through the end of said lever, and also through the lower end 39 of the take-up lever 40. In the upper bifurcation fits the extension 41 of the collar 32, a journal-pin 42 passing through the upper bearings of the link and through said extension 41 and also through the take-up lever above its end at the point 43. This mode of supporting the take-up lever upon the link-connection between the needle-lever and the needle-bar causes the take-up lever to have bodily movement with the said link. To securely fasten the link and takeup together, a screw 44 is passed through the aperture 44ª in the lower end of the take-up lever and tapped into the central portion 35 of the link, as clearly indicated in Figs. 1 and 2.

The take-up lever is given an outward bend at 45, in order to carry the same clear of the upper bearing 4 of the machine-frame and a guiding-finger coöperating therewith, and at its upper end said lever is bent at a right-angle to provide the enlarged thread-guiding portion 46, which is larger at one end than at the other, so as to have a greater take-up action on the thread near the needle-bar, as clearly shown in Figs. 2 and 3. When in place in the machine, this thread-guiding portion 46 extends toward the needle-bar and coöperates with a thread-guide clamped on the upper end of the needle-bar, as clearly shown in Figs. 1, 4, 5 and 6. Referring particularly to Fig. 4, it will be seen that the thread-guide is composed of the upper guiding-finger 47, having the attaching shank 48 at a right-angle thereto and provided with the several guide-eyes 49, through which the several threads, passing to the needle, are primarily led, after passing upwardly through the guiding-portion 46 on the upper end of the take-up lever. A lower guiding-finger 50 is provided with a shank 51 and the several guide-eyes 52 corresponding to those 49 in the upper finger 47. These two fingers carried by the upper end of the needle-bar are separated from each other by the spacing-sleeve 53, through which passes the clamping-screw 54 tapped at its lower end into the upper end of the needle-bar, the head of said screw 55 securely clamping the shank 48 of the upper finger against the top of the said sleeve 53, and the bottom of the latter securely clamping the shank 51 of the lower finger against the upper end of the needle-bar. The lower finger is, as clearly shown in Fig. 1, horizontally disposed and the guiding-portion 46 of the take-up lever operates between this lower finger and the upper finger 47. The several threads a, b and c come from the usual large cops suitably held in some manner near the machine, and primarily pass through the guiding-pins 56 arranged one above the other on the supporting-plate 57, pivotally carried at the top of the vertical portion 2 of the frame, near the rear of the latter. The said threads, after passing through the guides 56, pass respectively through the several tensions 58, and are then led to the selective guide 59, the shank of which is adjustably secured to the arm 3 of the frame by means of the screw 60, passing through the elongated slot 61, and tapped into said frame 3. The several threads next pass through the selective guide 62, which is rigidly clamped at 63 to the needle-lever 30. From this guide 62 the several threads pass upwardly through the guide 46 carried by the upper end of the take-up lever 40, and then horizontally through the several eyes 49 in the upper finger 47 carried by the needle-bar, and then downwardly through the said guide 46 of the take-up lever, and outwardly through the eyes 52 of the lower finger 50, carried by the needle-bar, and then downwardly and respectively around and between the several guiding-pins 64, carried by the lower end of the needle-bar, the threads then passing to the several needles 34. The guide-pins 64 are, in this instance of my invention, needle-clamping screws which pass through the needle-holder at the lower end of the needle-bar and engage in usual manner the upper ends of the respective needles. By thus leading the several threads, they are kept separated all the way to the needles and are led in a straight path directly along the body of the needles to the eyes thereof, thus preventing the said threads from becoming entangled. As will be clearly seen in Fig. 1, the upper end of the take-up operates between the upper and lower guiding-fingers carried by the needle-bar, and operates upon the thread in such manner as to have a large take-up action in a small stroke of the take-up lever, as will be presently described.

The bed-plate 1 of the machine, at its rear side, carries a bracket 65 rigidly secured thereto by means of screws 66 tapped into the bed-plate. This bracket, see Figs. 5 and 9, is provided with the upwardly-extending arms 67, providing at their upper ends bearings for the rock-shaft 68, to which is secured, between the said arms 67, the bell-crank lever 69, a screw 70 tapped into said lever and binding against said shaft, holding said shaft in place. The depending arm 71 of said bell-crank lever carries at its lower end the ball-screw 72, which is securely clamped therein by the nut 73, the ball of said screw being received in the outer end 74 of the strap 75 which surrounds the eccentric 76 carried by the driving-shaft 27 of the machine. In this manner, the bell-crank lever 69 is given its rocking movement, and its horizontal arm 77, which extends upwardly over the bracket 65, is given vertical rocking movements. The forward end of the arm 77 of the bell-crank lever is connected by means of any suitable universal joint, generally indicated by 78, with the outer end of the arm 79 of the rock-shaft 80, to which the other end of said arm is fixed, said rock-shaft being journaled in the bearing-extension 81 of the bracket 65 at one end, and at its other end in the bearings 82 of the bracket 83, adjustably clamped to the bed-plate 1 by means of the bolt 84, the adjustment of this bracket 83 being transversely of the bed-plate 1, by means of an enlarged hole or elongated slot 85 in said bracket, through which passes the bolt 84, and the said bracket being guided in its movements by means of the rib 86 depending therefrom, and which travels in the groove 87 of the bed-plate, see Figs. 9 and 10.

The rock-shaft 80 carries at its front end, between the two bearings 82, the looper-carrier 88, said carrier being fixed to said rock-shaft 80 so as to move therewith. At its upper end the carrier 88 has secured thereto, in any suitable manner, the looper 89, the hook 90 of which projects vertically from the body of the looper and toward the rear of the machine. The looper-body, on its face and at its rear and top edges, is provided with the beveled needle-deflecting portion 91, the same being provided for the purpose of preventing the needle striking the looper-body, thus saving both the looper and the needle from injury. The upper end of the carrier 88 has pivoted thereto at 92 one end of a flexible pitman 93, the other end of said pitman being pivotally connected at 94 to the forward end of the crank-arm 95 carried by one arm 96 of the bifurcated link 97, the other arm 98 of which is parallel with the arm 96. The lower end 99 of the link 97 is split and clamped upon the shaft or pin 100, journaled in the bearing 101, carried by the bracket 102 at one end. The spreader-carrier 97ᵃ is embraced by the arms 96—98 of link 97 and a pin 96ᵃ passes through said carrier and is secured therein by the screw 98ᵃ. The two arms 96—98 of the link 97 are journaled upon the said pin 96ᵃ on opposite sides of the carrier 97ᵃ, as will be readily understood upon reference to Figs. 17 and 17ᵃ. The bearing 101 is arranged perpendicularly oblique to the bed-plate of the machine, the result of which is that the several elements supported by it, together with the spreader-carrier 97ᵃ, are given an inclined position relatively to the bed-plate, resulting in tilting laterally the spreader 103, which is clamped by means of its shank 104 in the split forward-end 105 of the spreader-carrier, the screw 106 passing through the said split end of the carrier, operating to firmly clamp the shank 104 of the spreader in the spreader-carrier. The body of the spreader 103 is arranged at an obtuse-angle to its shank 104, and at a right-angle to its executive end 107, said executive end being provided with the usual slot 108 and the thread-eyes at each end of said slot, for the passage of the spreader-thread. The forward-end 110 of the spreader is bent both laterally and vertically relatively to the executive end of the spreader, thus enabling it to coöperate with the looper properly and engage and lift the several needle-thread loops, as will be clearly set forth in the description of the mode of operation of the machine. The rear end of the spreader-carrier is pivotally connected at 111 to the lower end of the link 112, the upper end of which link is pivoted at 113 to the pin 114, fixed by means of a screw 115, see Fig. 9, in the upper end of the vertical portion 116 of the bracket 102, the said pin 114 passing through the said vertical portion 116 in a plane vertically oblique to the bed-plate 1 of the machine, so as to be substantially parallel with the journal-pin 100 in the bearing 101 of said bracket 102. From this construction, it will be seen that the spreader, primarily, derives its movement from the train of mechanism running back to the driving-shaft 27 and including the rock-shaft 80, the arm 79 carried thereby, the universal joint connection 78, with the horizontal arm 77, of the bell-crank lever 69, the vertical arm 71 of which bell-crank lever is universally joined to the rear end of the eccentric-strap 75, which at its forward end embraces the eccentric 76 on the driving-shaft 27. It will also be seen that, secondarily, the spreader derives its movements from its pivotal support upon the inclined bearing 101, and its link-connection at its rear end with the inclined fixed pin 114, supported by the vertical portion 116 of the bracket 102. The spreader movement, in consequence, is compound in character, the result of which is that it coöperates with the looper below the cloth-plate behind the needles, takes the needle-loops from the looper and lifts said loops above the cloth-plate, and then passes into said loops and over the cloth-plate to a position in front of the needles. The functional operation of the spreader and its coöperation with the needles, the looper and other elements of the machine will be presently described in setting forth the mode of operation of the machine.

The back of the vertical portion 103 of the spreader is provided with a thread-guide 117, shown as a wire loop, through which the thread runs to the eye 109 of the spreader from the pull-off and thread-nipping device, illustrated particularly in Figs. 5 and 9. The thread-nipping device consists of the standard 118 fixed to the bed-plate 1 at its rear side near its rear end, or just below the vertical post 2 of the frame. This standard has journaled in it the shaft 119, on the outer end of which is fixed the pull-off arm 120, the upper end of which plays between two thread-guiding arms 121 and 122, the same being joined at their front ends, thus forming a U-shaped guide. At their front ends, each arm is provided with an aperture through which the thread is led, and the arm 121 being supported by the supporting-bracket 123, secured by screws 124 to the standard 118. Projecting vertically from the bracket 123 is one jaw 125, of the thread-nipper, the other jaw, 126, of which is carried by a plate 127, secured by means of screws 128 to the arm 129 of a bell-crank lever, journaled upon the shaft 119 near its front end, the other arm 130 of said bell-crank lever being extended horizontally toward the driving-shaft and bifurcated at its outer end so as to embrace the cam 131 carried by the driving-shaft 27, which also carries an eccentric, the collar of which is shown at 132, and which eccentric is surrounded by the strap 133, the other end of which is connected to the crank-arm 134, carried by the extreme forward end of the shaft 119, said latter shaft thus being rocked by the said eccentric and strap. Through the cam 131, the bell-crank lever is independently rocked, so as to have its operation in timed relation to the shaft, and cause the nipper-jaw 126 to grip the thread in proper timing with the movement of the pull-off arm 120, so that the latter may pull thread from the supply for the spreader.

In making the stitch illustrated in Figs. 14 and 15 by the three needles, the looper and the spreader, the needles are necessarily placed side-by-side transversely to the direction of feed, and the spreader is necessarily given quite an extensive forward movement in order that its thread may be caused to properly coöperate with the outermost needle of the three. This extensive forward movement of the spreader would, or might, result in carrying the loops of the needle-thread, lifted by it from the looper, over into the path of the innermost of the three needles, and to avoid the possibility of this action a loop-pusher is employed which engages the loops of needle-thread and pushes the same back on the body of the spreader and out of the way of the descending needles. In this instance of my invention the loop-pusher is shown to consist, see Figs. 10, 11, 19, 21 and 22, of the resilient latch or catch-bar 135, secured by its shank 136, to the lower end of the lower bearing-portion 4 of the overhanging-arm 3 of the machine, by means of the screws 137 passing through the elongated slots 138 in said shank and tapped into the said bearing 4. This enables the latch to be adjusted horizontally in the proper position for the purpose. The lower end of the latch 135 is curved horizontally into position behind the needle-bar, as shown at 139, and the outer end of said latch is provided in its back with a notch 140, for the reception of the shank 141 of the pusher, which shank is pivoted to the lower bearing-portion 4 of the frame by means of the screw 142, which is tapped into the said frame by its screw-threaded end 143, and which is provided with an enlarged smooth portion 144, just back of its head, for the reception of the shank 141, thus enabling said shank to swing freely on the screw when not held by the resilient latch. The lower end of the shank is enlarged as at 145, and bearing against this enlarged portion is the enlarged angular portion 146 of the pusher, which portion is slotted, as at 147, for the reception of the screws 148, which are tapped into the enlarged portion 145 of the shank. The handle of the pusher is indicated at 149 and its executive end is curved forwardly, as at 150, into close relation with the spreader when the latter is above the cloth-plate and is moving toward the front of the needles. Viewing the several figures, it will be readily understood that the construction and location of the pusher brings its executive end into such relation to the spreader that it will properly engage the needle-loops lifted above the cloth-plate and prevent them from being carried by the spreader forward into engagement with the needles; and, as the spreader moves forward, the pusher will push said loops back along the body-portion of the executive end 107 of the spreader, toward its vertical portion 103. This will be more particularly described with reference to the mode of operation of the stitch-forming mechanism in producing the overedge stitch. When it is desired to throw the pusher out of operative position, it can be easily accomplished by manipulating the handle 149 of the pusher, so as to swing the latter upon its pivot 142, the spring-latch 135 being first released to disengage the shank 141 of the pusher from the notch of the latch—see dotted-line positions in Figs. 1 and 21. When the pusher has been thus retracted, the resiliency of the latch will create pressure upon the shank of the pusher and thus hold the same in its raised inoperative position, as will be readily understood, see dotted-line representation, Fig. 1.

In the automatic formation of the line of overedge stitching, a feeding mechanism is necessary, and this mechanism is illustrated in the several figures, and with particular reference to Figs. 5, 9 and 10. it will be seen that the driving-shaft 27 is provided at its extreme forward end with an eccentric 152, surrounded by the strap 153, connected at its outer end 154, to the outer end of the shaft 155, journaled in the upper end of the rocking-frame 156, which is journaled at its lower end in bearings 157 of the bed-plate 1 by means of the rock-shaft 158, to which the rocking-frame is fixed. The shaft 155 carries the feed-bar 159. The forward end of which carries the feed-dog 160, which is shown as provided with the long, serrated surface 161, and the short, forward serrated surface 162, and the shorter, rear serrated surface 163. This feed-dog coöperates with the presser-foot 164, suitably supported by its shank 165, carried by the presser-bar 166, which slides vertically in the bearings 4 in the overhanging-frame of the machine. The said bar 166 is provided with a laterally-extending pin 167, with which coöperates the presser-foot-lifting lever 168, pivoted at 169 to the frame of the machine, this being a usual construction. A collar 170 is clamped to the presser-bar 166, and on said collar the front end of a flat spring 171 bears, said spring at its rear end finding a support upon the journal-pin 172 for the tension-bracket 57. In order to create tension to keep the presser-foot normally depressed in coöperative relation with the feed-dog, the lower end of a screw 173 bears upon the upper side of the spring 171, passing through the lug 174 of the arm 3, and the adjustment of the screw being held by the nut 175. The mechanism just described produces the feeding motion of the bar and causes the work to be clamped between the presser-foot and the feed-dog. The feed-bar is lifted by means of an eccentric carried by the shaft 27, the collar of which is shown at 176, said eccentric being surrounded by the strap 177, and the upper end of which is secured in any suitable manner to the under-side of the feed-bar adjacent the feed-dog, as shown at 178, in Fig. 10.

Thus far, I have described the three-needle overedge-stitching mechanism, the actuating mechanism of which I have found to be adapted for high speeds and accurate work, and which I have found equally adapted for use in connection with a single-needle overedge-stitching machine; but, for greater simplicity of construction, I have shown in Figs. 26 to 31 a spreader and looper-actuating mechanism, wherein the looper derives its functional movements directly from the spreader mechanism, rather than the reverse, which I have just described with reference to the other figures of the drawings. In my claims, I purpose covering these mechanisms in such broad terms that the spreader mechanism may be employed to drive the spreader, without reference to the derivation of the power for driving the actuating mechanism. In the following description, the alternative form of actuating mechanism will be described.

In Figs. 26 to 28, the feeding mechanism, including the presser-foot mechanism, the thread-nipper and pull-off mechanism, and machine-frame and the cloth-plate all have applied to them the same reference numerals, respectively, that are applied to like elements in the other figures of the drawings; but, the other elements presently to be described have different reference numerals applied thereto. In the said Figs. 26 to 31, wherein a single needle, and spreader and looper mechanisms are portrayed, the looper-carrier 180 is shown as journaled upon a short shaft 181 between the bearings 182 forming part of the bracket 183 secured by bolt 184 to the bed-plate 1 and capable of adjustment transversely of said bed-plate in the same manner and by the same means described with reference to the looper-support of the three-needle stitching mechanisms. The looper 185 is secured to the upper end of the carrier, and is of substantially the same construction as that shown in the other figures of the drawings, and the looper-carrier 180 is connected to the spreader mechanism by means of the flexible pitman 186, one end of which is pivotally connected at 187 to said carrier, and the other end of which is pivotally connected at 188 to the crank-arm 189, carried by the pin or short-shaft 190 fixed to the spreader-carrier 191 by means of the screw 192 tapped through said carrier and engaging said short-shaft 190. The outer end of the short-shaft has pivotally connected thereto the link 193, journaled at its lower end by means of its shaft 194 in the bearing 195 forming an extension of the standard 196, which is secured to the bed-plate 1 by means of the screws 197 passing through the base of the standard and tapped into the bed-plate.

It will be noted that the journal-bearing 195 is arranged at an inclination to the bed-plate, or stands vertically oblique to said bed-plate so as to tilt the link 193 and the spreader-carrier 191 laterally relatively to the bed-plate. The forward end of the spreader-carrier is formed into a clamp in which the shank 198 of the spreader is secured. The spreader-carrier and spreader in this construction are substantially the same as that shown in the construction previously described. The rear end of the spreader-carrier, see Fig. 29, is pivotally connected at 200 to the arm 201 of the bell-crank lever 202 secured to a journal-pin or shaft 203, having a bearing in the upper portion 204 of the standard 196, said bearing being arranged substantially parallel with the journal-bearing 195 so as to dispose the journal-pin 203 vertically oblique to the plane of the bed-plate and parallel with shaft 194. The other arm 205 of the bell-crank is made in the form of a clamp provided with a socket in which is held the shank 206 of the eccentric ball-pin 207 shown in detail in Fig. 31, said shank 206 of said pin being securely clamped in place in arm 205 by means of the screw 208, which passes through the outer end of said arm 205. The eccentric ball-pin is received in the socketed end 209 of the eccentric-strap 210 which, at its other end, surrounds an eccentric on the driving-shaft 27, the collar of which eccentric is indicated by 211. The ball-pin 207 and the socket 209 of the eccentric-strap constitute a universal joint connection between the bell-crank lever 202 and the eccentric on the driving-shaft, and in order to steady the action of said joint, and prevent the same from rattling under high speed, the frame of the socket 209 is provided on opposite sides with flexible or spring plates 212 which bear freely upon the adjacent side of the arm 205 of the said bell-crank lever. The details of said bell-crank lever 202, together with its journal-pin and the eccentric ball-pin as connected thereto, are shown in Fig. 30.

From the above description, it will be seen that the spreader-carrier is supported at an inclination to the bed-plate in substantially the manner described in connection with the spreader mechanism of the three-needle stitching machine and that the spreader will have imparted to it substantially the same movements relatively to the looper and needle as in the three-needle stitching mechanism; but, it will also be seen that the spreader mechanism is, in this instance, driven directly from the driving-shaft, and that the looper derives its movements directly from the spreader mechanism, this being the reverse action described with reference to the three-needle stitching mechanism. However, it is clear that these mechanisms are substantially interchangeable and that, so far as the functional operations are concerned, it is unimportant whether the spreader be actuated directly from the driving-shaft, and in turn directly actuates the looper, or whether the looper be actuated directly from the driving-shaft and in turn actuates the spreader. But, with reference to the construction shown in Figs. 27, 28, 29, it will be seen that there is greater simplicity and fewer parts. In both constructions, however, it is to be noted that the flexible connection between the looper and spreader carriers is composed of a steel-spring plate or strip having sufficient rigidity to prevent it from buckling transversely, but having sufficient flexibility to permit it to have torsional action, whereby the movement of one mechanism is positively and directly transmitted to the other mechanism, and the differences in the angular movement of the two mechanisms is compensated for by the flexure of the said connection. Moreover, by pivotally connecting the two said mechanisms by the said flexible connection, perfect ease of action is provided in both mechanisms without any binding strain.

In order to accommodate the different shape of standard employed in connection with the spreader deriving movements shown in Fig. 28, some modifications are made in the cloth-plate and slide-plate of the machine, and certain other changes are made in the throat-plate and presser-foot necessary to make the same coöperate with the single-needle and complemental stitch-forming mechanism of the type of machine shown in Fig. 28. These several changes and modifications are best illustrated in Fig. 26, and therein the cloth-plate 5 is shown as provided with a slide-plate 213 provided with the longitudinal, convex portion 214, which adapts said slide-plate to be moved in its guide-ways in the cloth-plate, over the oil-cap 215 with which the cloth-plate is provided in the rear of said slide-plate. The oil-hole 216 enables the oil to be applied to the joints of the looper-actuating mechanism lying below the same.

The oil-cap is riveted or otherwise suitably secured to the cloth-plate, as indicated at 217; and by convexing the same as shown head-room is given the actuating mechanism. A guide-piece 218, held by screws 219 to the cloth-plate, may be removed from the cloth-plate to permit the removal of the slide-plate 213; and the slide-plate is provided with an open-end slot 220 through which the spreader may work in passing to its forward position above the cloth-plate. The presser-foot in both instances of the mechanisms shown in the drawings may be provided with a knife-guard 221, the same being detachably secured to said foot by means of screws 222, and said foot is provided with the tongue 223 over which the stitches are formed, and from which they slip as the work is fed in making a line of stitching. The presser-foot is also provided with a notch 224 in its side, registering with a like notch in the throat-plate 225, through which notches a trimmer-blade plays.

Having thus described my invention, the following mode of operation will be readily understood, the description being particularly in connection with the three-needle overedge-stitching mechanism, and with reference to Figs. 12, 16, 18, 20 and 24. The arrows in the several figures show the direction of movement of the several elements. Assuming that several stitches have been made, and that the needle-bar has risen to substantially its upper extreme, and that the spreader has taken the needle-loops, of the several needle-threads a—b—c, from the looper and lifted them across the edge of the work, and that the looper is moving back again preparatory to again engaging the needle-thread, all as shown in Fig. 12, it will be understood that the needles are descending, the spreader is moving forward, and that the loops of needle-thread carried thereby have been brought into engagement with the loop-pusher 150. In Fig. 16, the spreader is shown as having reached its forward extreme of movement, is in the act of moving backwardly, and the needles have descended almost into engagement with the work, and passed through the loop of spreader-thread thrown out by the spreader, and the looper is again moving backward preparatory to taking the needle-loops while the loop-pusher has forced the needle-thread loops carried by the spreader back sufficiently far to prevent them being engaged by any of the needles. In Fig. 18, the needles, continuing their descent, have passed through the work to the lower extreme of their movement, and are now rising to throw out their loops and the looper is moving forward to take said loops, while the spreader is moving backward preparatory to descending below the cloth-plate. In the position of Fig. 20, the needles have risen sufficiently to throw out their loops, and the looper has moved to a position such that the hook is about to take the loop of the outermost needle, or the one on the extreme left, and the spreader has moved still farther back and is about to descend. In the position of Fig. 24, the needles are shown as having left the work in their upward movement, and as still moving upwardly, while the hook of the looper has passed from the position of Fig. 20 into the several loops of needle-thread, and has carried said loops over into position such that the spreader, which has descended to its lower and backward extreme, can lift said loops from the loop and carry them vertically across the edge of the work. In this figure, the looper is shown as beginning its backward movement, and the spreader as beginning its upward and forward movement, continuation of which movements will again bring the looper and spreader into the position of Fig. 12, the spreader-thread having been drawn back through the several loops previously carried by it across the edge of the work in accordance with the position of Fig. 20. These several operations will be continued in the order described for successive stitches with the result that three lines of straight stitching will appear on the top surface of the work composed of the several needle-threads, which lines of straight stitching will cross two adjacent strands of the spreader threads on the top surface of the work, as shown in Fig. 14, while, on the bottom of the work, two adjacent strands of spreader-thread will be inclosed by loops of the several needle-threads, as clearly shown in said figure.

The mode of operation of the single-needle stitch-forming mechanism, as shown in Figs. 26 to 31, is substantially the same as that just described with reference to the three-needle machine, and need not be explained in detail, but it should be understood that in performing its functions, the spreader is given a compound movement which causes the point of the spreader to pass from position below the cloth-plate behind the needles over the cloth-plate to in front of the needles. The inclination of the spreader-carrier and its path of travel, relatively to the needles and looper, are determined by the inclination of the support which constitutes a fulcrum for the spreader. The looper, it will be understood, has oscillating movements only in a single plane below the cloth-plate around the axis 80 or 181 as a fulcrum. In Fig. 25 I have shown an enlarged detail to portray the cooperation of the looper and spreader and the manner in which the latter lifts the needle-loops from the looper to carry them across the edge of the work.

During the operations just described of the looper, spreader, needles and pusher, the spreader-thread is under control by the pull-off and thread-clamping mechanism, the clamp operating to nip the thread as the pull-off draws or measures the requisite quantity of thread from the spool and releases the thread at the proper time to permit the spreader to pass forward with its spread loop without undue strain upon the latter. At the same time the take-up 40 is operating upon the needle-threads to control the same and draw in the slack and set the stitch, said take-up operating to draw in the needle-thread loops just as the needle-bar starts to descend and continues to operate, or reach the dotted-line position of Fig. 1, so as to draw in the slack of the loops and set the stitch until said needle-bar has made about one-third of its descent. The take-up, after reaching the lateral position shown by the dotted lines of Fig. 1, continues its descent with the needle-bar the other two-thirds of the distance of movement downwardly of the latter without any take-up action on the threads, but holds the latter so that there will be no slack formed in the loops about the points of the needles as they are descending into engagement with the work. Thus, the needle-threads are prevented from twisting and forming into loops, or becoming slack above the work, thus preventing any of the needles from catching and stitching down the threads of the other needles. Thus, a uniform stitch is produced and drag on the edge of the work, which would cause it to curl, is prevented and all possibility of such action is eliminated. The take-up action is such, as above set forth, that, when the needles descend, the threads carried by them are kept taut until the points of the needles have entered the work, and then there is no take-up action on the threads and no movement of the take-up other than the rise and fall thereof in unison with the needle-bar, until the latter has returned in its upward stroke two-thirds of its movement, when the take-up lever will be given its return movement, causing it to reach the full-line position from the dotted-line position, Fig. 1, by the time the needle has reached its upper extreme of movement, the take-up thus giving up the thread of the needles to the draw of the looper thereon. The action of the take-up is such also that it sets a tight stitch without creating unnecessary drag on the edge of the work, such as would crimp, cramp or curl the edge thereof. Moreover, by giving to the take-up the movements described, relatively to and with the needle-bar, the tension on the several threads does not have to be changed for stitching in succession through thick and thin work, and the spreader-thread is not drawn through or into the surfaces of the work, as is common in overedging machines now in use. Hence, a much more sightly and uniform edging or selvage is produced and the work is not distorted or crimped or gathered in an unsightly manner. The manner in which the threads lie and are concatenated is clearly shown in Figs. 14 and 15.

Having thus described my invention, what I claim and desire to secure by Letters Patent is:

1. A stitch-forming mechanism for sewing machines having, in combination, a plurality of needles; a single looper confined to oscillate below the work-plate of the machine and coöperating with the needles to take the loops therefrom; a thread-carrying spreader normally located below the work-plate and coöperating with the looper below the work and the needles above the work to take the loops of the needle-thread from the looper and carry said loops across the edge of the work and place a loop of its own thread in position to be entered by the needles; means for actuating the several elements and a loop-pusher coöperating with the spreader to prevent the loops carried thereby from being engaged by the needles.

2. A stitch-forming mechanism having, in combination, a plurality of needles; a single looper coöperating with said needles to take the loops therefrom; said looper being confined to movement in a single path below the cloth-plate of the machine; a thread-carrying spreader coöperating with the looper below the work and the needles above the work to take the needle-loops from the looper and carry the same across the edge of the work and pass its own thread through said loops and place a loop of its own thread in position to be entered by the needles; means for actuating the several elements; and a loop-pusher coöperating with the spreader to prevent the loops carried thereby from being engaged by the needles.

3. A stitch-forming mechanism having, in combination, a needle, a looper and a spreader; the looper being confined to movement in a single path below the cloth-plate and the spreader being mounted independently of the looper and on an axis arranged at an angle to that of the looper; means for actuating the looper; and means connecting the spreader with the looper mechanism whereby the spreader is actuated consonantly with the looper.

4. A stitch-forming mechanism having, in combination, a needle, a looper and a spreader; the looper being confined to movement in a single path below the cloth-plate and the spreader being mounted independently of the looper and on an axis arranged at an angle to the looper axis; means for actuating said elements including a flexible connection pivotally connected to two of said elements and connecting them together, whereby, by driving one of said elements the other is actuated consonantly therewith and therefrom.

5. A stitch-forming mechanism having, in combination, a needle, a looper and a spreader; the looper being confined to movement in a single path below the cloth-plate; means for supporting said spreader independently of the looper and obliquely relatively to the cloth-plate; means for actuating the several elements including a direct pivotal connection between the spreader and looper, whereby, when movement is imparted to one it will be transmitted directly to the other.

6. A stitch-forming mechanism having, in combination, a needle, a looper and a spreader; means for supporting the spreader in an oblique position relatively to the looper; and means for actuating the several elements including a direct driving connection between the looper and spreader, said connection comprising a flexible pitman.

7. A stitch-forming mechanism having, in combination, a needle, a looper and a spreader; means for confining the looper to oscillating movements below the cloth-plate; means for supporting the spreader at an inclination to the looper; and means for actuating the several elements, including a connection between the spreader and a stationary part of the machine below the cloth-plate, whereby the spreader is caused to operate in a path from below the cloth-plate behind the path of reciprocation of the needle over the edge of the cloth-plate to a position in front of the needle.

8. A stitch-forming mechanism having, in combination, a needle, a non-thread-carrying looper and a thread-carrying spreader; means pivotally connecting the looper and the spreader whereby one will drive the other with freedom of independent movement; means for actuating the looper and spreader including a driving eccentric; and a connection therefrom to one of the said elements.

9. A stitch-forming mechanism for forming overedge stitches having, in combination, a needle, a non-thread-carrying looper, a thread-carrying spreader, and a take-up for the needle-thread; a grip for the spreader-thread; and means for actuating the several elements, whereby the take-up is caused to move with and also relatively to the needle-bar so as to control the slack of the needle-thread and operate to set the stitch, and the spreader-thread is gripped and held taut as the stitch is set.

10. A stitch-forming mechanism having, in combination, a needle, a take-up, a non-thread-carrying looper and a thread-carrying spreader; means for actuating the several parts, including means for actuating the take-up to cause the latter to perform its take-up operation during substantially one-third of the downward movement of the needle, and set the stitch before the needle penetrates the work.

11. A stitch-forming mechanism for sewing machines comprising a plurality of needles each carrying a thread, a take-up, a looper, and a thread-carrying spreader, and a combined thread-nipper and pull-off for the spreader-thread; the looper being confined to reciprocations below the work while the spreader moves from in rear of the path of reciprocation of the needles below the work to in front in the needles above the work; means for actuating the several parts, whereby the spreader-thread may be held and measured preparatory for a stitch and the needles may be drawn in to set the stitch on a taut spreader-thread laid on opposite sides of the work and said spreader-thread will not be drawn into the work.

12. A stitch-forming mechanism having, in combination, a needle, a looper and a spreader; the looper being confined to operate in a plane perpendicular to the cloth-plate of the machine and below said cloth-plate; the spreader being supported and confined to operate in a plane oblique to both the plane of operation of the looper and the plane of the cloth-plate, and also the path of reciprocation of the needles; and means for actuating the several elements.

13. A stitch-forming mechanism having, in combination, a needle, a looper and a spreader; means connecting the spreader and looper, whereby one may drive the other; a spreader-carrier; and means for actuating the several parts including means for giving to the spreader a movement in a plane oblique to the cloth-plate of the machine and extending from below the cloth-plate in rear of the path of reciprocation of the needle to above the cloth-plate in front of the needle.

14. A stitch-forming mechanism having, in combination, a needle, a non-thread-carrying looper, a thread-carrying spreader, and a loop-pusher, the latter coöperating with and operating in rear of the spreader to prevent loops getting into the path of the needle; and means for actuating the needle, looper and spreader.

15. A stitch-forming mechanism having, in combination, a needle, a non-thread-carrying looper, a thread-carrying spreader, and a pusher, the pusher being held in a given position to coöperate with the spreader close to the path of movement of the needle; and means for actuating the needle, looper and spreader.

16. A stitch-forming mechanism having, in combination, a needle, a non-thread-carrying looper, a thread-carrying spreader, and a loop-pusher; means for supporting the pusher at the back of the spreader in position to coöperate with and to push loops back upon the latter; means whereby the pusher may be thrown out of operative position; and means for actuating the needle, looper and spreader.

17. A stitch-forming mechanism having, in combination, a needle, a non-thread-carrying looper and a thread-carrying spreader; means for actuating the needle; means for actuating the looper and spreader including a flexible connection between the two, whereby the movement of one is imparted to the other, but the said looper and spreader are permitted to move relatively.

18. A stitch-forming mechanism for forming overedge stitches having, in combination, a needle-bar carrying a needle, a non-thread carrying looper, a thread-carrying spreader and a take-up lever for the needle-thread extending longitudinally of the needle-bar; means for actuating the needle-bar including means for actuating the take-up, and means for actuating the other elements, whereby the take-up and needle may be moved together, but the needle and take-up may have relative movements, thus controlling the slack of needle-thread and setting the stitch, and means whereby the spreader-thread may be gripped as the stitch is set.

In testimony whereof I have hereunto signed my name in the presence of two subscribing witnesses.

JOHN P. WEIS.

Witnesses:
A. BENDER,
M. B. PATTERSON.